Dec. 8, 1931.                 P. FRITZSCHE                 1,835,941
            PROCESS OF RECOVERING SULPHURIC ACID FROM
                THE ACID TAR OF BENZOL PURIFICATION
                        Filed Sept. 7, 1927
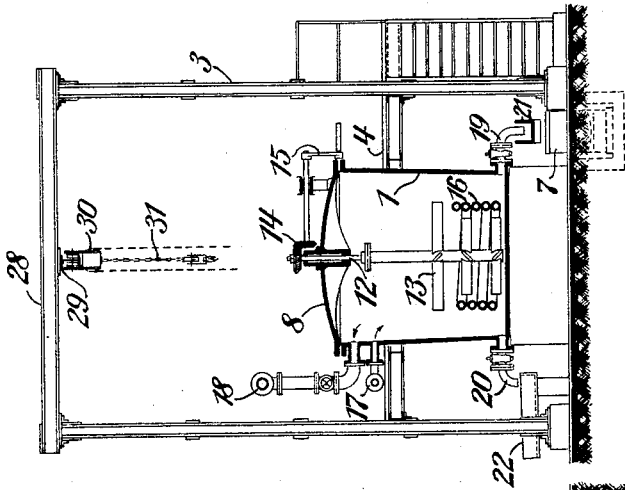
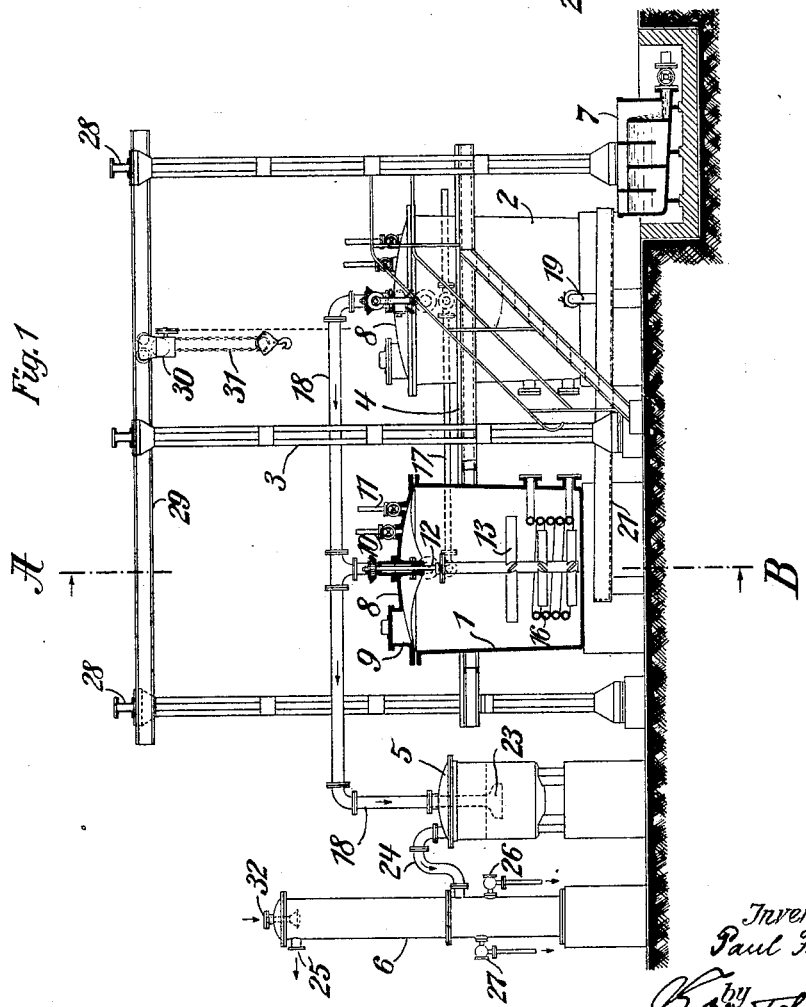
Inventor
Paul Fritzsche.
Attorney Patented Dec. 8, 1931

1,835,941

UNITED STATES PATENT OFFICE

PAUL FRITZSCHE, OF RECKLINGHAUSEN, GERMANY, ASSIGNOR TO THE FIRM: CARL STILL, OF RECKLINGHAUSEN, GERMANY

PROCESS OF RECOVERING SULPHURIC ACID FROM THE ACID-TAR OF BENZOL PURIFICATION

Application filed September 7, 1927, Serial No. 218,072, and in Germany September 20, 1926.

The subject of this invention is a process for the recovery of sulphuric acid used in the purification of benzol hydrocarbons and the like.

The process has a fundamental property, as it takes place without the employment of any excessive quantities of diluents, such as water or steam, and is generally characterized by the circumstance that the recovery of the sulphuric acid from the acid-tar is effected solely by mixing and stirring of the latter with a concentrated solution of ammonium sulphate. The mixture of the acid-tar recovered from the purified benzol hydrocarbons and the ammonium sulphate solution can be effected with aid of a mixing contrivance by direct or indirect application of heat, by superheated steam for example, or entirely without extraneous heat application. The selection of one or other of these alternatives depends upon the working conditions obtaining in each case, it being premised that for the attainment of a complete regeneration of the acid-tar, i. e., for complete separation of the acid resins from the sulphuric acid which has not entered into chemical combination during the benzol purification process, the resins must keep a certain degree of viscosity. The attainment of this condition implies the maintenance of a certain temperature, say 50 to 60° C., in the regeneration process as a premise. In cases where larger quantities of acid-tar are to be worked up, it will generally only be necessary at the commencement of the regeneration, during the admission of the acid-tar into the ammonium sulphate solution, to take care that the latter possesses the above-mentioned temperature, the heat of reaction arising during the process being sufficient for the maintenance of this temperature.

On the other hand, if only smaller quantities of acid-tar have to be worked up—as is possible in the case of smaller plants—then the loss of heat in the mixing vessel will exceed the heat of reaction and will bring about an inadmissible cooling of the mixture, as a result of which the acid resins will thicken and the separation of the sulphuric acid will be rendered difficult. This has to be counteracted by a special heating of the mixture, the practical method of doing this being the application of steam either directly or indirectly. Where only small quantities of heat are necessary, steam can be employed directly without hesitation, as in this case the resultant dilution of the ammonium sulphate solution is negligible. Further, in the case of a greater degree of heat being required, it is recommend that indirect heat be applied in order to avoid the introduction of too much water from condensed steam into the reacting fluids, which would have the result of unnecessarily diluting the sulphuric acid to be recovered.

Whichever method is selected, the acid resin separates on completion of the stirring easily and completely in the form of a viscous pitch or asphalt like mass. This floats on the liquid and, as it does not mix with water, can easily be separated from the acid solution. The sulphuric acid recovered has been taken up by the otherwise unaltered ammonium sulphate solution. On using this solution which has a faint red colour, for example for the manufacture of ammonium sulphate, no further pitch deposit takes place, thereby proving the complete separation of the acid resin.

The acid resin separated out of the solution contains all the benzol hydrocarbons originally mixed with or dissolved in the acid-tar. This being a considerable part of the quantity of benzol washed, it is necessary to recover it. For this purpose the resin after drawing off the ammonium sulphate solution must be heated to vaporize the benzol hydrocarbons. The vapors are washed with an alkaline solution to retain small quantities of sulphurous acid and then cooled and condensed.

In order to retain the state of fluidity of the acid resin in the condition in which it exists in the acid-tar, it is desirable to add tar, tar oils or the like in the measure of 1 to 1½ times its own weight.

The process offers the following advantages:—

(1) The process is very simple and cheap in operation. It does not involve the use of accurate measurement of materials to be mixed, as even considerable divergencies between the proportions of the ammonium sulphate solution and the acid-tar to be employed exert practically no influence on the process of regeneration. Apart from the expenditures of steam to remove benzol hydrocarbons from the acid resin and possibly to heat the bath at the commencement of regeneration, no extraneous expenses have to be applied, nor have new substances to be introduced—the ammonium sulphate solution being undiluted and in quantity as it was first introduced.

(2) The actual consumption of sulphuric acid for the purpose of benzol purifying, i. e., the difference between the quantity of sulphuric acid thus employed and recovered, is appreciably less than that required in the processes hitherto employed, because according to this invention, in the regeneration process the reduction from sulphuric to sulphurous acid which occurs quite noticeably in the old system, does not take place, and no noticeable quantities of sulphuric acid are carried away by the separated resin owing to its pitchy condition.

(3) The acid resin is recovered in a form which greatly facilitates its further use. It is practically free from acid—if necessary the last traces can be removed by washing it with water—and it can further be immediately added to the coal-tar to increase its pitch content and to improve it, or distilled and coked together with coking coal in coke ovens.

(4) The process can be profitably employed for the production of sulphate of ammonia in coking installations and gas works.

When working in such plants, the ammonium sulphate solution is taken from the ammonia saturator, and, in accordance with this invention, is treated with acid-tar, and, after the separation of the acid resin, it is returned together with the recovered sulphuric acid dissolved therein directly to the ammonia saturator. It must be noticed that the sulphuric acid is in a very high degree of concentration, as it is obtained from the acid-tar without the addition of any water.

The process may be illustrated by means of the attached drawings. Fig. 1 shows an elevation, partly in section; Fig. 2 shows a cross section on the line A—B of Fig. 1 of a typical installation.

The main parts of the plant are two mixing vessels 1 and 2 used for the recovering of the sulphuric acid, surrounded by an iron framework 3 and a working platform 4, a soda lye washer 5 for washing and cleaning and a cooler 6 for cooling and condensing the gases and vapors arising from the mixing vessels, a run-off box 7 for the ammonium sulphate solution containing the sulphuric acid recovered during the process.

The vessels 1 and 2 are fitted with lids 8, these lids being fitted with manholes 9. By means of feeds 10 and 11 the tar and water required in the process can be introduced; in the middle of lids 8 a vertical shaft is fitted carrying a propeller 13 reaching to the bottom of the vessels 1 and 2 respectively. The motion of the axle 12 is effected by means of a bevel gear 14 and a horizontal shaft operated from platform 4 by means of hand winch 15. At the bottom of the mixing vessels 1 and 2 there are heating coils 16 in each case for heating by indirect steam. Through duct 17 connected with both vessels and discharging close under the lids in the vessels, acid-tar or ammonium sulphate solution can be led at will. The gases and vapors developed in the vessels are drawn off by means of pipe 18. At the bottom of the vessels provision has in each case been made for a run-off 19 for the mixture of the ammonium sulphate solution with the recovered sulphuric acid and 20 for the acid resin. The run-off 19 is connected by means of trough 21 with a separating box 7 whereas pipe 20 discharges the acid resin into trough 22. The vapor pipe 18 discharges into the soda lye washer 5 by means of a distributing hood 23. By means of pipe 24 the exhaust gases and vapors are transferred to the cooler 6 from which they escape into the atmosphere through socket 25. Cooler 6 is fitted at the top with a water ejector 32 fitted at its lower end with a distributing hose. The lower par of this cooler serves as a separator, the water being thrown off by overflow 26 and the recovered benzol through 27.

The framework 3 by means of cross bearers 28 carries a runway 29 arranged over the centres of the vessels 1 and 2 on which a trolley 30 with a lifting tackle 31 runs. This lifting tackle is for the purpose of raising or lowering lids 8 or other parts when dismantling vessels 1 and 2. During operation and also when the plant is not at work lids 8 remain fitted to their vessels.

To illustrate the working of the process the quantity of acid-tar produced by the use of 800 kg. of concentrated sulphuric acid used in the purification of, say, 10000 kg. of crude benzol may be worked up. This acid-tar amounts to about 1350 kg. or 0.9 cbm. and is approximately of the following composition:

| | |
|---|---|
| Pure sulphuric acid ($H_2SO_4$) | 710 kg. |
| Water (partly dilution water from original acid and partly the product of washing reactions) | 120 kg. |
| Acid resins in solution | 320 kg. |
| Benzol hydrocarbons | 200 kg. |

After the separation of this acid-tar from the benzol it is allowed to flow into the vessels 1 or 2 which have been previously filled with about 1000 kg. or 0.77 cbm. of ammonium sulphate solution introduced through pipe 17. In cases where this solution can be taken from the ammonia saturator of a by-product plant, it is drawn off from the saturator at a period when its sulphuric acid content is brought down to its lowest concentration, i. e., about 4%. The simplest method is to take the solution from the mother liquor coming from the ammonium sulphate centrifuge. The ammonium sulphate solution is approximately of the following composition:—

| | |
|---|---|
| Water | 500 kg. |
| Ammonium sulphate $(NH_4)_2SO_4$ | 460 kg. |
| Sulphuric acid $(H_2SO_4)$ | 40 kg. | and has a temperature of about 55° C. If the solution on entry is colder than this temperature, then it must be heated by means of the steam coil 16. Thereafter the heating is cut off when the requisite temperature is reached. During the process of filling with acid-tar, propeller 13 is rotated by means of hand winch 15. As already mentioned the mixing of the acid-tar with the ammonium sulphate solution causes a slight heating of the mixture in the vessel, and this, in conjunction with the agitation generally is sufficient to bring about the process of regeneration. Only in exceptional cases will it become necessary during the process of recovering the sulphuric acid to add extraneous heat with the aid of a steam coil, principally when working up smaller quantities of acid-tar, where the arising heat of reaction is not sufficient to keep the resin in a liquid state.

Any gas or vapor, including benzol vapors given off from the acid-tar during the process of filling up and mixing are drawn off through the pipe 18 and treated as below. The fluid mixture is allowed to remain in the vessel for about ten hours without heat application. The acid resin is entirely separated from the ammonium bisulphate solution, and contains the major portion of the benzol content of the acid-tar. The ammonium bisulphate solution underneath the acid resin contains about 40% free acid, and is of pale red colour. It is allowed to run off through the bottom draw-off cock 19 of the mixing vessel and led away through run-off trough 21 and the separating box 7, eventually to the saturator. Box 7 is fitted with baffle plates effecting a separation of any particles of resin carried away with the effluent solution. As a result the solution has the following approximate composition:—

| | |
|---|---|
| Water 500+120 | 620 kg. |
| Ammonium sulphate $(NH_4)_2SO_4$ | 460 kg. |
| Sulphuric acid $H_2SO_4$ | 750 kg. |
| | 1830 kg. |

The recovered sulphuric acid equivalent to 710 kg. of pure sulphuric acid is mixed in its original concentration of 85% as present in the acid-tar with the ammonium sulphate solution which has passed through the process and remains unaltered, the water content of the reacting constituents having been unaltered during the regeneration. When this acid containing solution is returned to the ammonia saturator from which it was taken, it can be used as fresh sulphuric acid with high acid content.

After drawing off the ammonium sulphate solution the remaining resin is heated by means of coil 16 whereby the benzol hydrocarbons contained therein are volatilized and expelled. The benzol vapors together with any other gas and steam given off are drawn through pipe 18 and passed the same way as the vapors and gases already given off in filling and mixing. The vapors and steam are first washed in the soda lye washer 5 with soda lye in order to neutralize any small portion of acid especially sulphurous acid gas and sulphuric acid which may have been carried along. After this the vapors and steam are cooled in cooler 6 by being sprayed with water from spray 32. Condensation of the benzol hydrocarbons and steam takes place and separation is effected in the bottom portion of cooler 6. The spent cooling water is drawn off through run-off 26 and the benzol through run-off 27.

The acid resin in a fluid condition freed from benzol can now be allowed to run through the bottom run-off 20 of the mixing vessel along the trough 22 into suitable pans or boxes in which on cooling it reaches ordinary temperature and becomes hard. As previously mentioned it is possible, if required, to retain it in a liquefied state at ordinary temperature by adding tar or tar oils and the like in suitable quantities to allow of its being transported considerable distances. The admixture of these materials is effected before, during or after heating employed for benzol evaporation through the pipe connection 10 affixedly to lid 8 of the mixing vessel.

By this admixture of tar not only is a state of fluidity of the resin maintained, but another advantage is secured, i. e., that the resin can be washed more easily with water in the mixing vessel prior to its discharge, thus removing any slight traces of acid and ammonia sulphate salt yet adhering, if great purity of the acid resin is necessary.

For this purpose the mixing vessels 1 and 2 with the propellers 13 can be used to advantage. The necessary water for washing is introduced through pipe 11 in the lids 8 of the vessels 1 and 2. The quantity of water required is about one-fifth of the resin-tar mixture. The wash water after separation settles on the top and can be easily separated from the resin-tar mixture when the latter is drawn off. In order to make use of its ammonia content, it is best mixed with the ammonia liquor from the by-product plant.

Now, what I claim is:—

1. The process for treating the acid-tar from benzene purification, which comprises mixing the same with a concentrated solution of ammonium sulphate, whereby the sulphuric acid contained in said tar will enter the concentrated ammonium sulphate solution, and separating and removing the acid-containing ammonium sulphate solution.

2. The process of treating the acid-tar from benzene purification, which comprises mixing the same with a concentrated aqueous solution of ammonium sulphate, whereby the free sulphuric acid contained in said acid-tar will enter the said ammonium sulphate solution, heating the mixture to insure rapid stratification of the now acid-containing layer, and removing the latter from the now supernatant non-aqueous solution of the tar.

3. The process of treating the acid-tar from benzene purification, which comprises mixing the same with a concentrated aqueous solution of acid ammonium sulphate, whereby the free sulphuric acid contained in said acid-tar will enter the said ammonium sulphate solution, heating the mixture to insure rapid stratification of the now acid-containing layer, and removing the latter from the now supernatant non-aqueous solution of the tar.

4. The process of recovering free sulphuric acid from acid-tar derived from benzene purification, which comprises mixing said acid-tar with a concentrated solution of ammonium sulphate to extract the free sulphuric acid from said tar, whereby a supernatant layer of a solution of acid-resins in tar results, separating said supernatant layer and heating the same to recover volatile matter therefrom, and recovering sulphuric acid from the lower layer of ammonium sulphate solution.

5. The process of recovering free sulphuric acid from acid-tar derived from benzene purification, which comprises mixing said acid-tar with an acid solution of substantially 46% ammonium sulphate to extract the free sulphuric acid from said tar, whereby a supernatant layer of a solution of acid-resins in tar results, separating said supernatant layer and heating the same to recover benzene therefrom, and recovering sulphuric acid from the lower layer of ammonium sulphate solution.

6. The process of recovering sulphuric acid from the acid-tar of benzene purification, which comprises the steps of mixing the acid-tar with a concentrated aqueous solution of ammonium sulphate, whereby the sulphuric acid contained in the said acid-tar is dissolved by the ammonium sulphate solution, separating said acid-containing ammonium sulphate solution from the rest of the mixture by stratification, and removing said acid-containing ammonium sulphate solution.

7. The process of treating the acid-tar of benzene purification which comprises the steps of mixing the acid-tar with a substantially 46% aqueous solution of ammonium sulphate and heating the mixture, whereby the sulphuric acid contained in the acid-tar enters the ammonium sulphate solution, drawing off the clear aqueous solution thus formed, and heating the remaining acid resins, whereby the benzene and other hydrocarbons contained in the latter are vaporized.

In testimony whereof I affix my signature.

PAUL FRITZSCHE.